2,882,265
PROCESS FOR RECOVERING WHOLE ZEIN

Leo Morris, Argo, and Alexander Logan Wilson, Palos Park, Ill., assignors to Corn Products Company, a corporation of New Jersey No Drawing. Application January 14, 1957
Serial No. 633,822

2 Claims. (Cl. 260—123)

This invention relates to a new process for the extraction and recovery of whole zein from corn gluten.

Zein has been defined as the prolamine from corn gluten. About 75 percent of the total protein in gluten is prolamine. The product representing all of the prolamine in gluten is herein designated as whole zein. This is different from commercial zein in the following respects. Only about two-thirds of the total prolamine in gluten is extracted as commercial zein. This is the relatively stable fraction soluble in high concentration of alcohol (roughly to 85 percent b.w. isopropyl at 25° C.). The remaining one-third is an extremely unstable fraction, soluble in lower concentrations of alcohol. Whole zein comprises the combined fractions, and has an intermediate but fixed character, soluble in roughly 40–60 percent of alcohol, and to our knowledge has never been recovered successfully.

Inasmuch as zein is soluble in water at high pH and for obvious reasons of economy, many efforts have been made to extract zein from corn gluten by means of aqueous systems without the use of organic solvents. However, none of these have been successful. Investigators, in trying to extract zein in a cheaper manner, have had to content themselves with merely trying to reduce the number and amount of solvents used in its preparation. All methods to-date of extracting and recovering zein from corn gluten have used two solvents, i.e., alcohol for extraction and hexane for deoiling. Furthermore, the concentrations of alcohol which are used successfully commercially are high, i.e., 80–85 percent. The prior art methods disclose the use of lower alcohol concentrations with preferred ranges of 50–55 percent to recover zein from corn gluten but they were always subject to certain difficulties. For example, the very conditions, i.e., high temperatures and long times of extraction, which increased the amount of protein extracted were also the conditions which induced a certain amount of protein denaturation. As a result of the denaturation, it was not possible to recover all of the prolamine and portions which were in the extract would set up to a gel. Swallen, U.S. 2,332,356, sought to overcome this difficulty by precipitating out the unstable fraction by specific treatment. This, of course, decreased the yield of zein recovered and also added to the cost of recovering it. When using lower than 50–55 percent of alcohol, all known data point to insignificant yields of recoverable zein.

We have discovered that we can successfully extract zein from corn gluten by using an aqueous system containing 28–33 percent by weight of alcohol and which contains at least 6 percent of lime, based on gluten, D.B. (preferably 9–10 percent). By means of our method, we have, for the first time, succeeded in extracting zein from corn gluten without the coextraction of oil. Thus we have been able not only to eliminate the costly hexane deoiling step involving separation and recovery of mixed solvents but by means of the low alcohol concentration have been able to effect considerable savings in the alcohol. Also, we not only have been able to extract and recover zein with significantly lower concentration of alcohol than the prior art discloses, and without the use of a second deoiling solvent, but we have also stabilized the prolamine fraction susceptible to denaturation so that for the first time, it can readily be extracted and recovered along with the commercial zein fractions which are extracted and recovered by prior art methods. Thus our process will produce the whole zein fraction by use of a low alcohol range of 28–33 percent, an accomplishment heretofore completely impossible.

We have found no alternative to calcium hydroxide when used in sufficient amount. Strong alkalies, as well as lime in insufficient amounts, accelerate gelling of zein. In higher amounts lime works as specified and caustic or other strong alkalies solubilize not only the zein in corn gluten but also the non-zein proteins, all of the oils or soaps, color bodies, and, furthermore, gelatinize the starch contained in the gluten. Practical separation of such zein extracts from the gluten residue has never been possible, nor has the recovery of a zein, with good qualities, from the extract. We have found that an extraction process using the low alcohol concentrations specified is possible only if it contains at least 6 percent of lime. In such a system, the zein is extracted quantitatively from the gluten without coextraction of the oil and color bodies and the non-zein protein and without gelatinizing the starch. The extract containing the zein may be separated easily from the gluten residue as by centrifugation or filtration and the zein recovered from the extract in conventional manner. Since the extract need not be treated with hexane as is usual in deoiling procedures, the zein can be concentrated by chilling the extract and the supernatant liquor may be reused in subsequent extractions. This accomplishes further savings in alcohol which is not possible in present procedures.

Furthermore, we can carry out our process without the prior art disadvantages of high temperatures since the temperature of the extraction is not critical. The reaction is more efficient if the system is heated and generally a temperature of 70° C. to boiling temperature of the alcohol is preferred.

Isopropyl alcohol is the preferred alcohol but other zein solvents, such as ethyl alcohol, are also satisfactory.

The following examples illustrate the manner in which our invention may be applied. They are for illustrative purposes only and are not to be construed as limiting our invention.

Example I

Fire-dried corn gluten (100 g.) was mixed with 700 ml. of 30 percent by weight isopropyl alcohol and 8 grams of lime. The slurry was heated at 75° C. for 15 minutes, centrifuged while still warm (½ minute at 2000 r.p.m., International No. 2 type centrifuge), cooled to 30° C. and allowed to settle. (The amount of total N extracted was 75 percent.) The supernatant liquor was decanted and added to fresh alcohol for a subsequent extraction. The lower phase after 10 cycles was added to water to precipitate the zein in conventional manner. The product contained only 2 percent of oil and 100 percent of protein (percent N×6.25) on an oil free basis. The nitrogen was over 99 percent soluble in 0.1 N aqueous alkali and in 60 percent isopropyl alcohol, and the solutions had a light color.

Example II

Extraction and centrifugation were carried out similarly to Example I except that the total centrifugate was then precipitated in water and recovered with no recycle procedure. Approximately 75 percent of precipitate protein was extracted from the gluten with properties similar to those of Example I.

Example III

One hundred grams gluten was mixed with 9 grams lime and 700 ml. of 32 percent by weight isopropyl alcohol. The slurry was heated at 75° C. for 30 minutes, centrifuged, cooled to 30° C. and allowed to settle. The supernatant was decanted and added to fresh solvent for the second extraction. After 20 cycles the lower phase was recovered. The product analyzed 2.8 percent oil and was 99 percent soluble in aqueous alcohol or alkali.

Example IV

One hundred grams gluten was mixed with 700 ml. of 30 percent by weight isopropyl alcohol (no lime). The slurry was heated at 75° C. for 30 minutes, and centrifuged. There was sufficient gel in the system to prevent good separation and yield determination.

Example V

One hundred grams of corn gluten was mixed with 6 grams of lime and 700 ml. of aqueous isopropyl alcohol (50 percent by weight). The slurry was heated at 75° C. for 15 minutes and centrifuged to recover the extract. The zein was recovered from the extract by precipitation in cold water. The product contained 10 percent of oil. Such a product would require deoiling with hexane in the usual manner.

This invention is a continuation-in-part of application Serial No. 524,587, filed July 26, 1955, now abandoned, which is a continuation-in-part of Serial No. 393,506, filed November 20, 1953, now abandoned.

We claim:

1. A process for recovering substantially all of the zein from corn gluten which comprises agitating said gluten with the equivalent of aqueous isopropyl alcohol of 28 to 33 percent alcohol by weight in the presence of at least about 6 percent of lime based on the gluten and separating the zein from the extract.

2. Process according to claim 1 wherein the agitation is carried out at a temperature ranging from 70° C. to boiling temperature of the alcohol.

References Cited in the file of this patent

UNITED STATES PATENTS

| | | |
|---|---|---|
| 696,156 | Waulkan | Mar. 25, 1902 |
| 1,320,508 | Swett | Nov. 4, 1919 |
| 2,332,356 | Swallen et al. | Oct. 19, 1943 |
| 2,676,169 | Baldoni | Apr. 20, 1954 |

OTHER REFERENCES

Swallen: Ind. and Eng. Chem., vol 33 (1941), pp. 394–6.